United States Patent
Yuan et al.

(10) Patent No.: US 7,567,878 B2
(45) Date of Patent: Jul. 28, 2009

(54) EVALUATING ANOMALY FOR ONE CLASS CLASSIFIERS IN MACHINE CONDITION MONITORING

(75) Inventors: Chao Yuan, Secaucus, NJ (US); Claus Neubauer, Monmouth Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 334 days.

(21) Appl. No.: 11/563,241

(22) Filed: Nov. 27, 2006

(65) Prior Publication Data

US 2007/0143038 A1   Jun. 21, 2007

Related U.S. Application Data

(60) Provisional application No. 60/742,990, filed on Dec. 7, 2005.

(51) Int. Cl.
*G01N 37/00* (2006.01)
(52) U.S. Cl. ....................................................... 702/81
(58) Field of Classification Search ................... 702/81, 702/182, 183
See application file for complete search history.

(56) References Cited

U.S. PATENT DOCUMENTS

| 5,742,522 A | 4/1998 | Yazici et al. |
| 7,308,322 B1 * | 12/2007 | Discenzo et al. .............. 700/28 |
| 2005/0216114 A1 | 9/2005 | Hsiung et al. |

FOREIGN PATENT DOCUMENTS

EP        1 484 719 A      12/2004

OTHER PUBLICATIONS

Tax, David M. J., "Combining One Class Classifiers," Multiple Classifiers Systems, vol. 2096 (2001) pp. 299-308.
International Search Report.

* cited by examiner

*Primary Examiner*—Drew A Dunn
*Assistant Examiner*—Stephen J Cherry

(57) ABSTRACT

A method for monitoring machine conditions provides additional information using a one-class classifier in which an evaluation function is learned. In the method, a distance is determined from an anomaly measurement x to a boundary of a region $R_1$ containing all acceptable measurements. The distance is used as a measure of the extent of the anomaly. The distance is found by searching along a line from the anomaly to a closest acceptable measurement within the region $R_1$.

16 Claims, 4 Drawing Sheets

EVALUATING ANOMALY FOR ONE CLASS CLASSIFIERS IN MACHINE CONDITION MONITORING

CROSS REFERENCE TO RELATED APPLICATIONS

This application claims the benefit of U.S. Provisional Patent Application Ser. No. 60/742,990 entitled "Evaluating Anomaly for One-Class Classifiers in Machine Condition Monitoring," filed on Dec. 7, 2005, the contents of which are hereby incorporated by reference in their entirety.

FIELD OF THE INVENTION

The present invention relates generally to the field of machine condition monitoring, and more particularly, to techniques and systems for extracting additional useful information from a one-class classifier.

BACKGROUND OF THE INVENTION

Many manufacturing and service equipment installations today include, in addition to systems for controlling machines and processes, systems for machine condition monitoring. Machine condition monitoring systems include an array of sensors installed on the equipment, a communications network linking those sensors, and a processor connected to the network for receiving signals from the sensors and making determinations on machine conditions from those signals.

The purpose of machine condition monitoring is to detect faults as early as possible to avoid further damage to machines. Traditionally, physical models were employed to describe the relationship between sensors that measure performance of a machine. Violation of those physical relationships could indicate faults. However, accurate physical models are often difficult to acquire.

An alternative to the use of physical models is the use of statistical models based on machine learning techniques. That approach has gained increased interest in recent decades. In contrast to a physical model, which assumes known sensor relationships, a statistical model learns the relationships among sensors from historical data. That characteristic of the statistical models is a big advantage in that the same generic model can be applied to different machines. The learned models differ only in their parameters.

There are two basic types of statistical models used in machine condition monitoring a regression-based model and a classification-based model. In a regression model, a set of sensors are used to predict (or estimate) another sensor. Since a regression model can produce a continuous estimate, the deviation of the actual value from the estimate can be used directly for fault diagnosis. For example, a simple logic can be built as "the larger the deviation, the greater the chance of a fault."

In a classification-based model, the output is discrete. One application of a classification-based model is an out-of-range detector wherein a one-class classifier is often employed. A one-class classifier output indicates whether there is an out-of-range condition or not. Such output information is too limited to be useful in any sophisticated level of machine fault diagnostics. There, is therefore a need to extract useful information from a one-class classifier to benefit high-level fault diagnosis.

One-class classification refers to a special type of pattern recognition problem. Let $C_1$ be a certain class of interest. For a test input x, a one-class classifier output indicates whether x belongs to $C_1$ or $C_0$ (which represents any class other than $C_1$). If x does not belong to $C_1$, then x is often called an anomaly (or a novelty). Generally, the objective of training a one-class classifier is to find an evaluation function $f(x)$, which indicates the confidence or probability that the input x belongs to $C_1$. That evaluation function $f(x)$ accordingly defines the decision region $R_1$ for class $C_1$ such that $R_1=\{x: f(x) \geq T\}$, where T is a decision threshold. If $f(x) \geq T$, x is classified as $C_1$; otherwise, x is classified as $C_0$.

One-class classification has been used in many applications including machine condition monitoring. In many one-class classification problems, only a binary decision output is available; i.e., x belongs to $C_1$ or x belongs to $C_0$. In many circumstances, however, in addition to knowing that x is an anomaly, there is also a need to evaluate that anomaly to see how different it is from the distribution of $C_1$.

A decision region $R_1$, shown in FIG. 1, depicts a normal operating range of a sensor vector in a machine condition monitoring example. The range $R_1$ is bounded by line 120 defined by $f(x)=T$. During a monitoring period, two different anomalies, $x_1$ and $x_2$, are detected by the same one-class classifier. Of the two, $x_2$ is very different from the normal operating range $R_1$; it is therefore very likely that $x_2$ represents a faulty state. $x_1$, however, is much closer to $R_1$. Such a small deviation may not be due to a fault, but may instead be due to a minor misoperation or measurement noise. In the case of $x_2$, inspection should be called right away. In case of $x_1$, however, typically a warning note should be made, and further observation should be required before any serious action is taken. It would therefore be beneficial to have additional information about a measurement beyond a simple indication whether the measurement is within the normal range.

One could directly use the evaluation function $f(x)$ to evaluate an anomaly. In many algorithms, however, the value of $f(x)$ does not contain physical significance and cannot serve as a meaningful measure.

There is therefore presently a need for a method for providing additional information about measurements in a one-class classification system used in machine condition monitoring. That method should glean information about how different a particular anomaly is from the normal operating range of a machine.

SUMMARY OF THE INVENTION

The present invention addresses the needs described above by providing a machine monitoring method. The method evaluates an anomaly detected by a one-class classifier. The anomaly x is projected onto the closest boundary of the decision region $R_1$ and the distance between x and the projection of x is used as the measure for the anomaly.

One embodiment of the invention is a method for evaluating an anomaly measurement x' in a machine condition monitoring system wherein measurements $x_i$ are evaluated in a one-class classifier having a decision region $R_1$ for the class $C_1$ such that an evaluation function $f(x)$ is greater than or equal to a threshold T for a measurement x within the region, and less the T outside the region. The method includes the steps of training the one-class classifier to establish the decision region $R_1$ from a set of training samples $\{x_1, x_2, \ldots, x_N\}$; receiving the anomaly measurement x'; determining that the anomaly measurement is outside the region $R_1$; determining a distance from the measurement x' to a boundary of the region $R_1$; and evaluating the anomaly measurement x' based on the distance.

The distance may be a Euclidean distance. The step of determining a distance from the measurement x' to the region $R_1$ may be performed iteratively.

The step of determining a distance from the measurement x' to the region $R_1$ may further comprise the steps of finding a closest sample q, in the region $R_1$, to the measurement x'; and defining an average point m between the measurement x' and the closest sample q. If a difference between $f(m)$ and T is greater than a permissible error then if $f(m)<T$, assign m to x' and return to the defining step; and if $f(m)>T$, assign m to q and return to the defining step. If the difference is less than the permissible error, assigning a distance from the measurement x' to m as the distance from the measurement x' to a boundary of the region $R_1$.

The step of finding a closest sample q, in the region $R_1$, to the measurement x' may further comprise using Euclidean distances between x' and the samples.

The step of finding, a closest sample q, in the region $R_1$, to the measurement x' may further comprise the step of reducing a number of samples in the region $R_1$ by applying a k-mean algorithm.

The step of evaluating the anomaly measurement x' based on the distance may further comprise evaluating a degree of the anomaly based on the distance. The step of defining an average point m between the measurement x' and the closest sample q may further comprise calculating (x'+q)/2.

The method may further comprise the step of obtaining the evaluation function $f(x)$ using an algorithm selected from the group consisting of a nearest neighbor algorithm, a probability density function and an inner product for a support vector representation machine.

In another embodiment of the invention, a computer-usable medium is provided having computer readable instructions stored thereon for execution by a processor to perform the methods described above.

DESCRIPTION OF THE INVENTION

Figure 1:
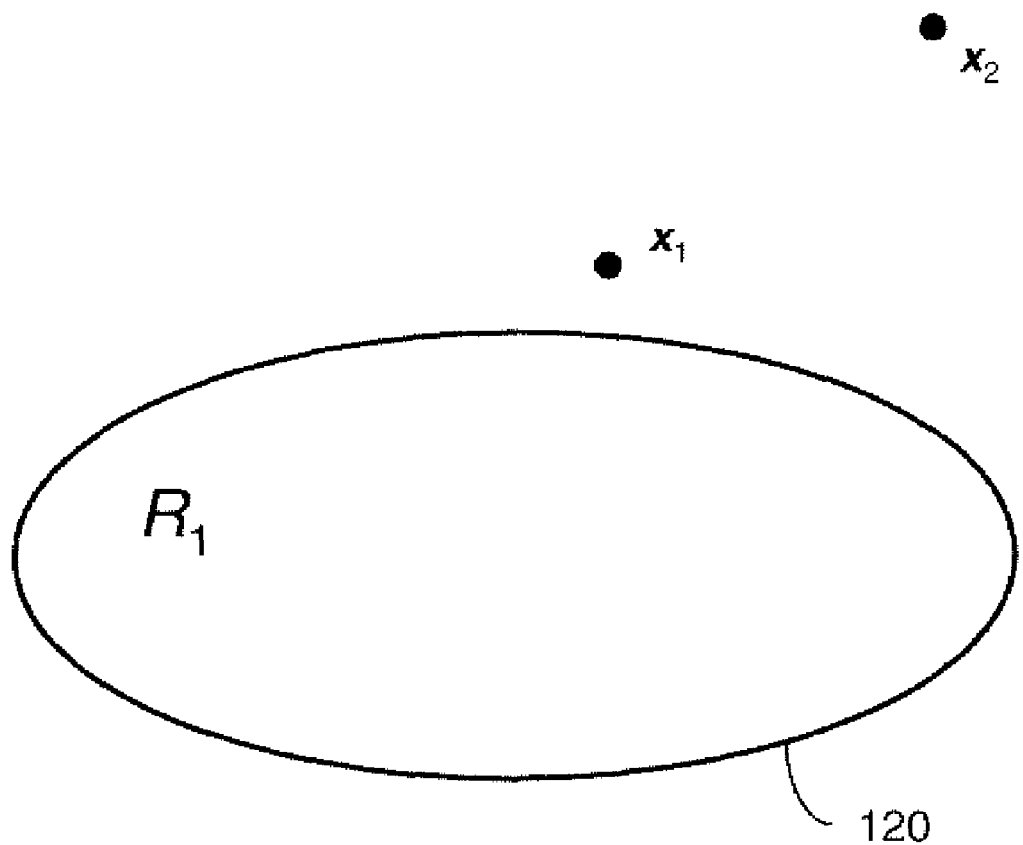
FIG. 1 is a schematic visualization of a single-class classifier used in a machine monitoring system showing anomalies.
Figure 2:
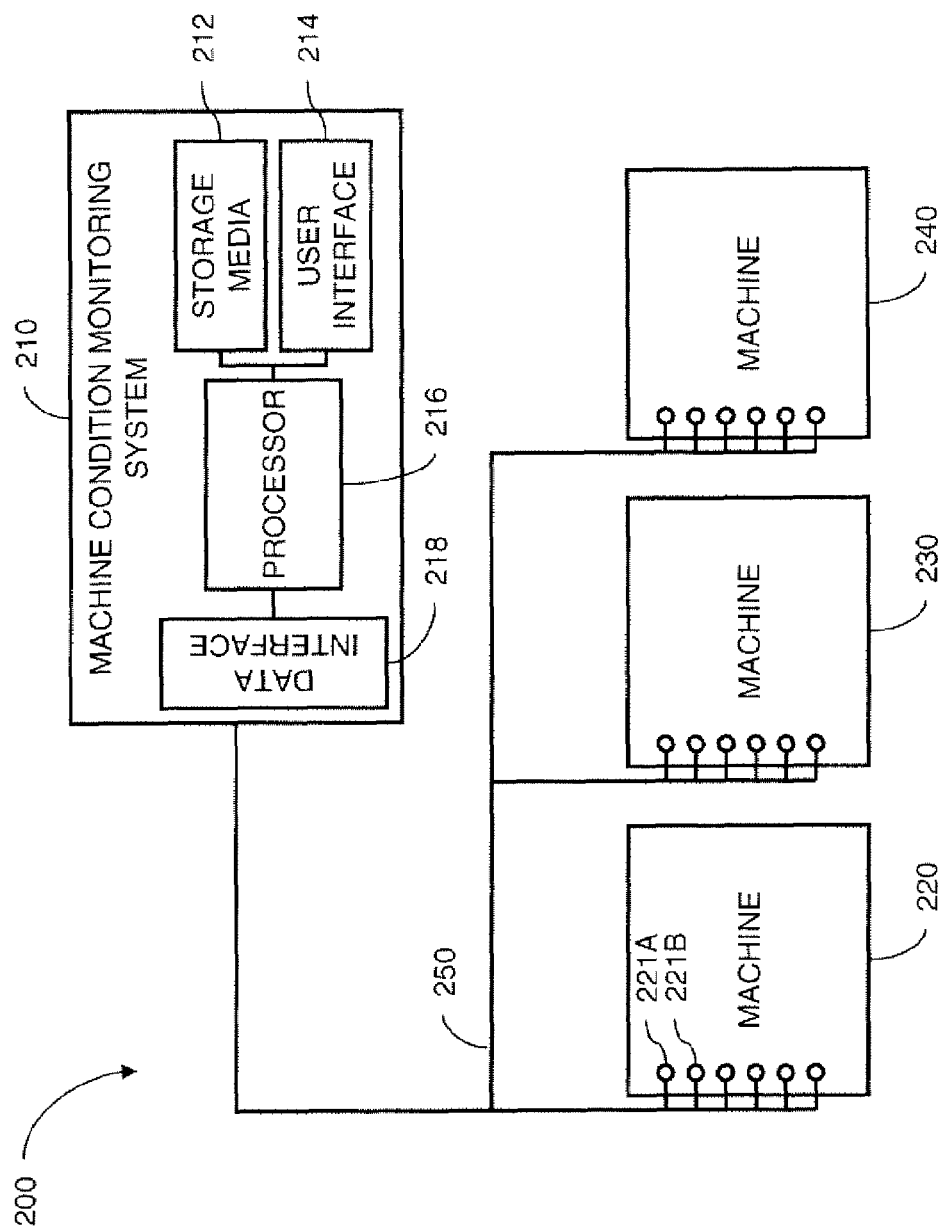
FIG. 2 is a schematic illustration of a machine monitoring system according to one embodiment of the invention.

A system 210 for monitoring conditions of machines 220, 230, 240 according to one embodiment of the invention is shown in FIG. 2. The system includes a plurality of machine sensors such as the sensors 221A, 221B connected to machine 220. The sensors may, for example, be accelerometers, temperature sensors, flow sensors, position sensors, rate sensors, chemical sensors or any sensor that measures a condition of a machine or process. The sensors measure conditions chosen because they are related in predictable ways that reflect the presence or absence of normal operating conditions in an installation 200.

The sensors 221A, 221B are connected through a data network 250 to a data interface 218 in the machine condition monitoring system 210. A processor 216 receives the sensor data from the data interface 218 and performs the monitoring methods of the invention. The processor is connected to storage media 212 for storing computer-readable instructions that, when executed, perform the monitoring methods. The storage media 212 may also store historical data received from the sensors 221A, 221B. A user interface 214 is provided for communicating results and receiving instructions from a user.

Figure 3:
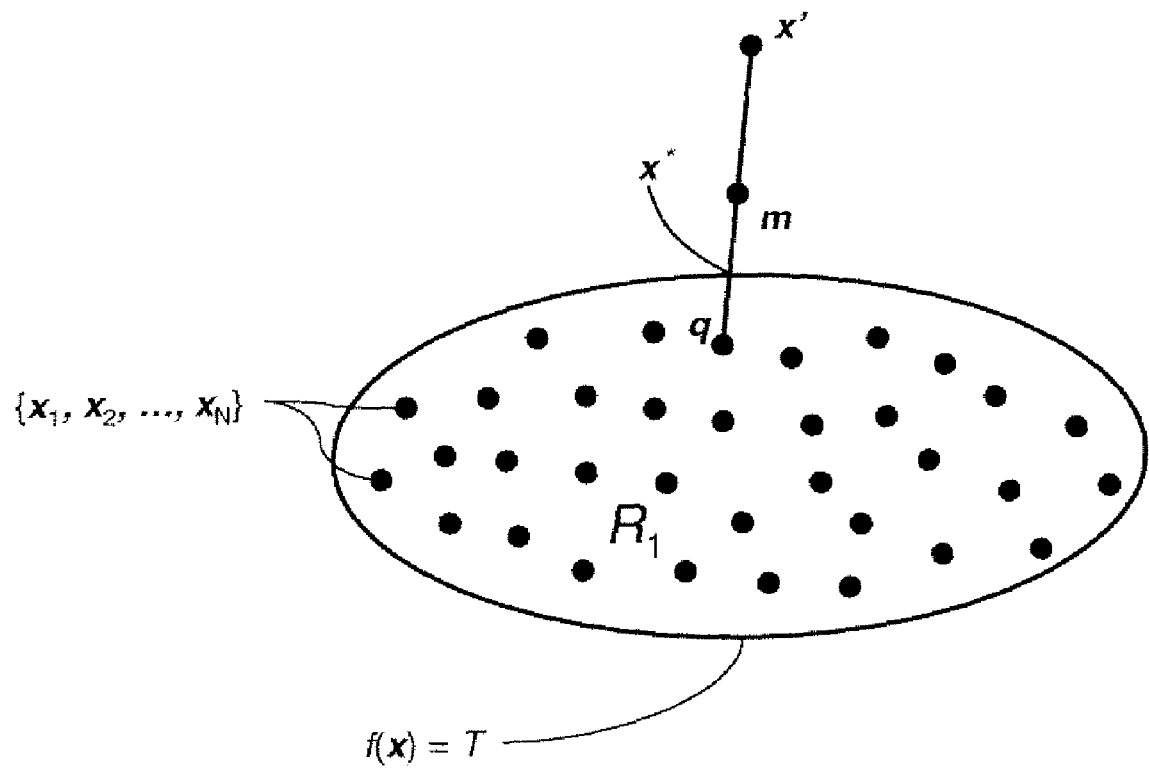
FIG. 3 is a schematic visualization of a single-class classifier used in a machine monitoring system, illustrating a method according to one embodiment of the invention.

The method of the invention utilizes a group of "good" measurements such as a set of training samples $\{x_1, x_2, \ldots, x_N\}$ for class $C_1$, shown in FIG. 3. While there may also be negative training samples from the class $C_0$, those samples are not used in the present method.

After the training process, we obtain the evaluation function $f(x)$, the form of which depends on the learning algorithm. For example, using a nearest neighbor algorithm, $f(x)$ may be defined as 1 minus the minimum distance between the input x and $x_i$. $f(x)$ may also be a probability density function or an inner product for the support vector representation machine. For any of those one-class classifiers, if x is within $R_1$ or $f(x) \geq T$, where T is a decision threshold, x is classified as $C_1$; otherwise, x is classified as $C_0$ or an anomaly.

If x is classified as an anomaly such as the measurement x' of FIG. 3, that anomaly is evaluated according to the invention. x is projected to the closest boundary of $R_1$ and the projection x* is obtained. The value |x−x*| (where | | denotes the norm of a vector) is used as the measure for a magnitude of the anomaly.

The value x* is approximated using a two-step algorithm. As shown in FIG. 3, it is assumed that, in the set of "good" measurements that populate the decision region $R_1$, every prototype q satisfies $f(q) \geq T$. As noted, those prototypes may simply be the training set $\{x_1, x_2, \ldots, x_N\}$, which are within $R_1$.

If the number of training samples is large, k-mean algorithms may be applied to reduce the number of prototypes.

In the first step of the method, a closest prototype q to the anomaly x' is found using Euclidean distance. For example, if q and x' are two dimensional vectors, the training samples are searched for a q having a minimum distance D between that q and x', where:

$$D = \sqrt{(x_{x'} - x_q)^2 + (y_{x'} - y_q)^2}.$$

The method searches for x* which satisfies $f(x^*)=T$, between $x(f(x^*)<T)$ and $q(f(q) \geq T)$. An iterative search is performed as follows:

(I) An average point is calculated: m=(x'+q)/2.

(II) If $f(m)$ is close enough to T, the method is stopped and x*=m.

(III) If $f(m)<T$ (as shown in FIG. 3), assign x'=m and go back to (I).

(IV) If $f(m)>T$, assign q=m and go back to (I).

As shown schematically in FIG. 3, the decision region $R_1$ is produced by training using the prototypes $x_i$. For the anomaly x', the closest prototype is found to be q. m=(x'+q)/2 is the average point after the first iteration. x* is the final projection point.

Most one-class classifiers produce only a binary output: normal or abnormal. In case of an anomaly, however, the ability to evaluate the extent of anomaly is important in many applications, as shown above. The method of the invention addresses how to evaluate an anomaly detected by a general one-class classifier. The distance between the anomaly x' and its closest projection point x* on the boundary of the decision region $R_1$ is used as that measure. The method of the invention provides a technique for searching, for x*. The results can server as inputs to high-level fault diagnosis.

Figure 4:
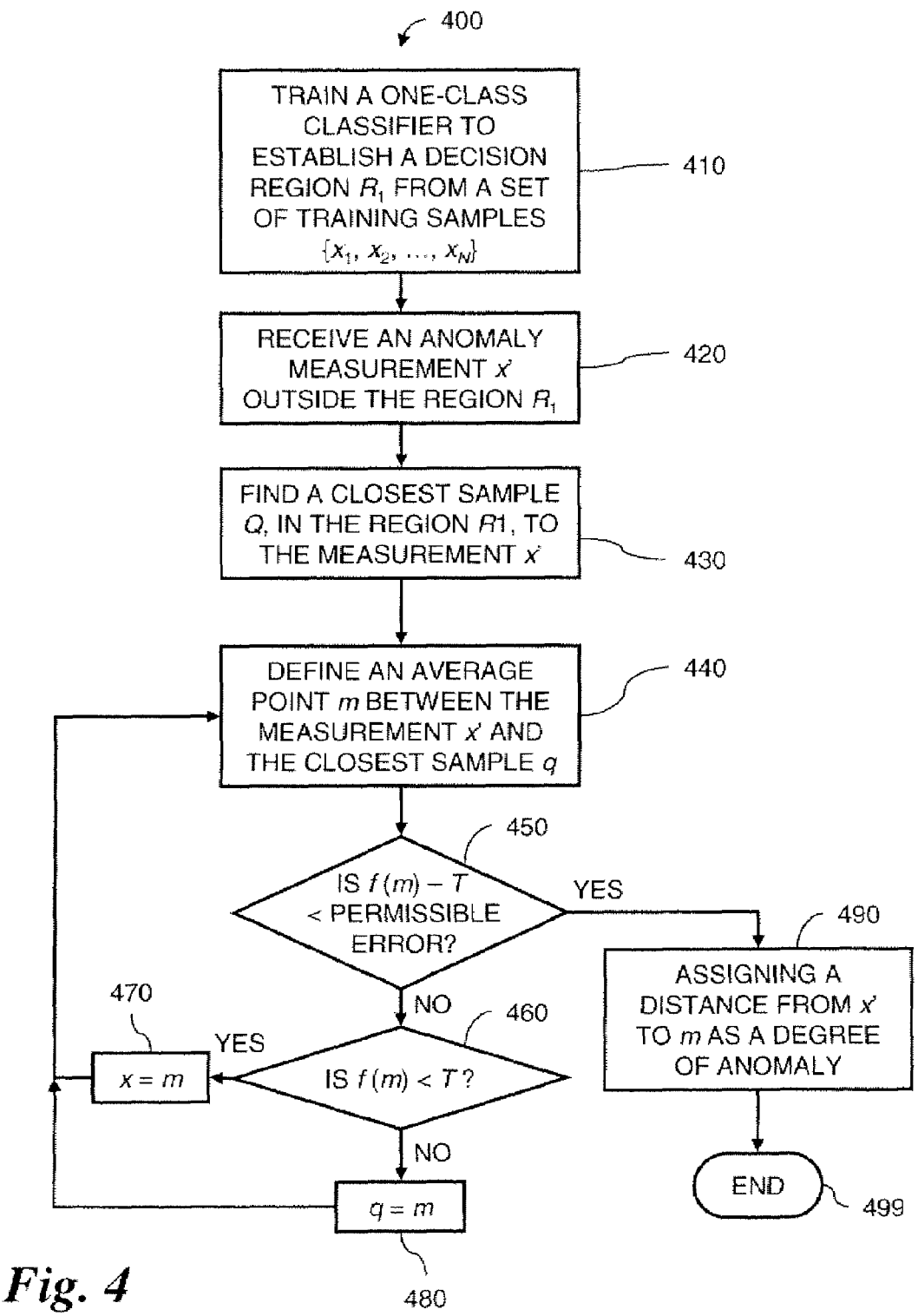
FIG. 4 is a flow chart representing, a method according to one embodiment of the invention.

A method 400 of the invention is illustrated in the flow chart of FIG. 4. A one class classifier is initially trained (step 410) to establish a decision region $R_1$ from a set of training samples $(x_1, x_2, \ldots, x_N)$. The training yields a function $f(x)$ whereby a value of $f(x)$ less than a threshold T indicates an anomaly, and a value of $f(x)$ greater than of equal to T indicates a measurement within the decision region $R_1$.

A measurement x' is received (step 420) that is an anomaly measurement; i.e., a measurement that is outside the region $R_1$. Once the measurement x' is determined to be an anomaly, a closest sample q of the training samples $(x_1, x_2, \ldots, x_N)$ is found (step 430).

An iterative process is then invoked to find a distance from the measurement x' to a border of the region $R_1$; i.e., to the nearest point where $f(x)=T$. An average point m is defined (step 440) between the measurement x' and the closest sample q. $f(m)$ is then evaluated, and if the value of $f$ at m is sufficiently close to T (decision 450), then a distance from x' to m is calculated and is used as a measure of anomaly of the measurement x' (step 490) and the method terminates (step 499). Whether or not the value of $f$ at m is sufficiently close to T may be determined by whether the values are within a permissible error of each other.

If $f(m)-T$ is greater than the permissible error, then if $f(m)<T$ (decision 460) (i.e., it m is outside the region $R_1$), x is set to m (step 470) and the method returns to the step of determining an average point m between x' and q (step 440). If $f(m)>T$ (decision 460) (i.e., if m is inside the region $R_1$), q is set to m (step 480) and the method returns to the step of determining an average point m between x' and q (step 440).

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the method is disclosed herein as describing machine condition monitoring, the method may be used in any statistical evaluation system having a learned binary output, while remaining within the scope of the invention. It is to be understood that the embodiments shown and described herein are only illustrative of the principles of the present invention and that various modifications may be implemented by those skilled in the art without departing from the scope and spirit of the invention.

What is claimed is:

1. A method for evaluating an anomaly measurement x' in a machine condition monitoring system including a processor, wherein measurements $x_i$ are evaluated in a one-class classifier having a decision region $R_1$ for the class $C_1$ such that an evaluation function $f(x)$ is greater than or equal to a threshold T for a measurement x within the region, and less than T outside the region the method comprising the steps of:
    training the one-class classifier to establish the decision region $R_1$ from a set of training samples $\{x_1, x_2, \ldots, x_N\}$;
    receiving the anomaly measurement x';
    determining that the anomaly measurement is outside the region $R_1$;
    determining, using the processor, a distance from the measurement x' to a boundary of the region $R_1$; and
    evaluating the anomaly measurement x' based on the distance;
    wherein the step of determining a distance from the measurement x' to the region R1 further comprises the steps of:
    finding a closest sample q, in the region $R_1$, to the measurement x';
    defining an average point m between the x' and q;
    if a difference between $f(m)$ and T is greater than a permissible error, then if $f(m)<T$, assign m to x' and return to the defining step; and if $f(m)>T$, assign m to q and return to the defining step; and
    if the difference is less than the permissible error, assigning a distance from the measurement x' to m as the distance from the measurement x' to a boundary of the region $R_1$.

2. The method of claim 1, wherein the distance is a Euclidean distance.

3. The method of claim 1, wherein the step of determining a distance from the measurement x' to the region $R_1$ is performed iteratively.

4. The method of claim 1, wherein the step of finding a closest sample q, in the region $R_1$, to the measurement x' further comprises using Euclidean distances between x' and the samples.

5. The method of claim 1, wherein the step of finding a closest sample q, in the region $R_1$, to the measurement x' further comprises the step of:
    reducing a number of samples in the region $R_1$ by applying a k-mean algorithm.

6. The method of claim 1, wherein the step of evaluating the anomaly measurement x' based on the distance further comprises evaluating a degree of the anomaly based on the distance.

7. The method of claim 1, wherein the step of defining an average point m between the measurement x' and the closest sample q further comprises calculating $(x'+q)/2$.

8. The method of claim 1, further comprising the step of:
    obtaining the evaluation function $f(x)$ using an algorithm selected from the group consisting of a nearest neighbor algorithm, a probability density function and an inner product for a support vector representation machine.

9. A computer-usable medium having computer readable instructions stored thereon for execution by a processor to perform a method evaluating an anomaly measurement x' in a machine condition monitoring system wherein measurements $x_i$ are evaluated in a one-class classifier having a decision region $R_1$ for the class $C_1$ such that an evaluation function $f(x)$ is greater than or equal to a threshold T for a measurement x within the region, and less than T outside the region, the method comprising the steps of:
    training the one-class classifier to establish the decision region $R_1$ from a set of training samples $\{x_1, x_2, \ldots, x_N\}$;
    receiving the anomaly measurement x';
    determining that the anomaly measurement is outside the region $R_1$;
    determining a distance from the measurement x' to a boundary of the region $R_1$; and
    evaluating the anomaly measurement x' based on the distance;
    wherein the step of determining a distance from the measurement x' to the region R1 further comprises the steps of:
    finding a closest sample q, in the region $R_1$, to the measurement x';
    defining an average point m between the x' and q;
    if a difference between $f(m)$ and T is greater than a permissible error, then if $f(m)<T$, assign m to x' and return to the defining step; and if $f(m)>T$, assign m to q and return to the defining step; and
    if the difference is less than the permissible error, assigning a distance from the measurement x' to m as the distance from the measurement x' to a boundary of the region $R_1$.

10. The computer-usable medium of claim 9, wherein the distance is a Euclidean distance.

11. The computer-usable medium of claim 9, wherein the step of determining a distance from the measurement x' to the region $R_1$ is performed iteratively.

12. The computer-usable medium of claim 9, wherein the step of finding a closest sample q, in the region $R_1$, to the measurement x' further comprises using Euclidean distances between x' and the samples.

13. The computer-usable medium of claim 9, wherein the step of finding a closest sample q, in the region $R_1$, to the measurement x' further comprises the step of:
  reducing a number of samples in the region $R_1$ by applying a k-mean algorithm.

14. The computer-usable medium of claim 9, wherein the step of evaluating the anomaly measurement x' based on the distance further comprises evaluating a degree of the anomaly based on the distance.

15. The computer-usable medium of claim 9, wherein the step of defining an average point m between the measurement x' and the closest sample q further comprises calculating $$(x'+q)/2.$$

16. The computer-usable medium of claim 9, further comprising the step of:
  obtaining the evaluation function $f(x)$ using an algorithm selected from the group consisting of a nearest neighbor algorithm, a probability density function and an inner product for a support vector representation machine.

* * * * *